United States Patent
Chang et al.

(10) Patent No.: US 8,116,406 B2
(45) Date of Patent: Feb. 14, 2012

(54) APPARATUS AND METHOD FOR GENERATING SOFT BIT METRIC AND M-ARY QAM RECEIVING SYSTEM USING THE SAME

(75) Inventors: Dae-Ig Chang, Daejon (KR); Deock-Gil Oh, Daejon (KR); Kwang-Min Hyun, Seoul (KR); Dong-Weon Yoon, Seoul (KR); Sang-Kyu Park, Gyeonggi-do (KR)

(73) Assignee: Electronics and Telecommunications Research Institute, Daejon (KR)

( * ) Notice: Subject to any disclaimer, the term of this patent is extended or adjusted under 35 U.S.C. 154(b) by 860 days.

(21) Appl. No.: 12/096,119

(22) PCT Filed: Dec. 7, 2006

(86) PCT No.: PCT/KR2006/005260
§ 371 (c)(1),
(2), (4) Date: Jun. 4, 2008

(87) PCT Pub. No.: WO2007/066985
PCT Pub. Date: Jun. 14, 2007

(65) Prior Publication Data
US 2008/0285685 A1 Nov. 20, 2008

(30) Foreign Application Priority Data

Dec. 8, 2005 (KR) .................. 10-2005-0119590
Aug. 30, 2006 (KR) .................. 10-2006-0083170

(51) Int. Cl.
*H04L 27/00* (2006.01)
(52) U.S. Cl. ......... 375/324; 332/115; 370/207; 714/709

(58) Field of Classification Search .................. None
See application file for complete search history.

(56) References Cited

U.S. PATENT DOCUMENTS 5,541,955 A * 7/1996 Jacobsmeyer ............... 375/222
(Continued)

FOREIGN PATENT DOCUMENTS

EP 0 840 483 5/1998
(Continued)

OTHER PUBLICATIONS

Ramesh Mahendra Pyndiah; "Near-Optimum Decoding of Product Codes: Block Turbo Codes," (IEEE Transaction Communication, vol. 43, pp. 2360-2369, Aug. 1998.

(Continued)

*Primary Examiner* — David C. Payne
*Assistant Examiner* — Adolf Dsouza
(74) *Attorney, Agent, or Firm* — Ladas & Parry LLP

(57) ABSTRACT

Provided are an apparatus and method for generating a soft bit metric and a multi-level (M-ary) Quadrature Amplitude Modulation (QAM) receiving system using the same. The apparatus includes an analog to digital converter for converting an analog symbol signal of a demodulated I (Inphase) or Q (Quadrature) channel into a digital signal, a scaler for scaling the converted digital signal based on a reference value used for determining a space between symbols, a positive integer converter for calculating a positive integer of the scaled digital I or Q channel symbol signal, a sign determinator for determining a sign of the scaled digital I or Q channel symbol signal, and a bit information converter for converting the scaled digital I or Q channel symbol signal into soft bit metric information per bit on the basis of the calculated positive integer and the determined sign value.

11 Claims, 6 Drawing Sheets

U.S. PATENT DOCUMENTS

| | | | |
|---|---|---|---|
| 6,347,122 B1 | 2/2002 | Chen et al. | |
| 7,245,666 B1 * | 7/2007 | Gardner et al. | 375/267 |
| 2002/0026615 A1 * | 2/2002 | Hewitt et al. | 714/752 |
| 2006/0274862 A1 * | 12/2006 | Lui et al. | 375/341 |

FOREIGN PATENT DOCUMENTS

| | | |
|---|---|---|
| GB | 2 379 143 | 2/2003 |
| KR | 1020020051549 | 6/2002 |
| KR | 1020040111571 | 12/2004 |

OTHER PUBLICATIONS

Stéphane Le Goff, et al; "Turbo-Codes and High Spectral Efficiency Modulation," (ICC'94 Proceedings, vol. 2, pp. 645-649, May 1994).

Charles W. Wang; "A Bandwidth-Efficient Binary Turbo Coded Waveform Using QAM Signaling," (IEEE 2002 International Conference, vol. 1, pp. 37-41 Jun. 2002).

International Search Report mailed Mar. 14, 2007; PCT/KR2006/005260.

* cited by examiner

APPARATUS AND METHOD FOR GENERATING SOFT BIT METRIC AND M-ARY QAM RECEIVING SYSTEM USING THE SAME

TECHNICAL FIELD

The present invention relates to an apparatus and method for generating a soft bit metric and a multi-level (M-ary) Quadrature Amplitude Modulation (QAM) receiving system using the same. More specifically, the invention relates to an apparatus and method for generating a soft bit metric, in which a received symbol signal is converted into soft bit metric information per bit and then transmitted to an iterative decoder such as a Turbo or Low Density Parity Check (LDPC) decoder so as to recover data from the received signal modulated by a higher-order modulation scheme, and an M-ary QAM receiving system using the same.

BACKGROUND ART

Iterative decoding schemes are used in a receiver in order to perform channel coding using Turbo codes or LDPC codes. However, since an M-ary QAM modulation signal in which one symbol is expressed as some bits is transmitted in symbol unit, it is inevitable that a symbol signal is converted into information in the form of bits for iterative decoding. Such conversion is accomplished by soft decoding, soft metric, Log Likelihood Ratio (LLR), soft demapping and the like.

Therefore, as will be described later, in an M-ary QAM receiving system that transmits $\log_2 M$ number of bits per symbol by using Gray mapping, the present invention is to convert a received symbol signal into soft bit metric information per bit (I or Q channel) and transmits the converted information to an iterative decoder such as a Turbo or LDPC decoder, as illustrated in FIG. 2.

As methods for converting a symbol signal into a bit signal, there are generally a Maximum A Posteriori (MAP) scheme and a signal space division scheme. However, since the MAP scheme is very complex in formula operation, it is advanced to a log-MAP that applies algebraic operation to MAP. And, the log-MAP is again enhanced to a Max-Log-MAP algorithm with even lower complexity in design. On the other hand, the signal space division scheme uses geometric space division formulas to divide signal space based on a constellation position of a transmitted signal. So there are many different implementation methods that are based on the signal constellation.

In general, a Look-Up Table (LUT) based method using a memory is employed to reduce implementation complexity, but it also has drawbacks in that errors may occur, and especially, when Adaptive Modulation and Coding (AMC) scheme that changes a modulation method is used, various LUTs must be provided depending on a given symbol arrangement and also be updated according to a selected modulation method.

Moreover, the conventional MAP exhibiting high-performance involves an exponential calculation, the log-MAP that is logarithmic MAP requires an exponential operation, and the Max-Log-MAP that approximates the log-MAP also has high-complexity in design. In particular, even in case of a scheme using a signal space, an LUT must be configured in accordance with a symbol arrangement.

Therefore, the iterative decoding scheme is essential for maintaining an efficient and stable communication quality in receiving a higher-order modulation signal. This iterative decoding scheme is based on binary transmission, and thus, when a higher-order modulation symbol signal is received, the symbol signal should be converted into information in the form of bits so that the receiving system can effectively employ the binary iterative decoding scheme.

Especially, the QAM decoding method is known to be the best decoding method that can most effectively use the same bandwidth. However, the QAM transmission is susceptive to the influence of fading or noises and thus requires a high Signal to Noise Ratio (SNR) to ensure stable reception. The iterative decoding scheme is useful to compensate the above shortcomings because it can acquire the high coding gain over channel coding such as Turbo codes or LDPC codes, which becomes a transmission system suitable for wideband transmission. In order to utilize the iterative decoding scheme for the higher-order modulation QAM signal, it is absolutely necessary to generate a soft bit metric that converts a transmitted symbol signal into soft bit information.

Consequently, the soft bit metric generation for the conversion of symbol-to-bit information requires a complex operation algorithm, so there is a need to develop a new scheme for reducing implementation complexity of such algorithm and generating soft bit metric information effectively.

DISCLOSURE

Technical Problem

It is, therefore, an object of the present invention to provide an apparatus and method for generating a soft bit metric, in which a received symbol signal is converted into soft bit metric information per bit and then transmitted to an iterative decoder such as a Turbo or LDPC decoder so as to recover data from a received signal modulated using higher-order modulation scheme, and an M-ary QAM receiving system using the same.

The other objectives and advantages of the invention will be understood by the following description and will also be appreciated by the embodiments of the invention more clearly. Further, the objectives and advantages of the invention will readily be seen that they can be realized by the means and its combination specified in the claims.

Technical Solution

In accordance with one aspect of the present invention, there is provided an apparatus for generating a soft bit metric, including: an analog to digital converter for converting an analog symbol signal of a demodulated I or Q channel into a digital signal; a scaler for scaling the converted digital signal based on a reference value used for determining a space between symbols; a positive integer converter for calculating a positive integer of the scaled digital I or Q channel symbol signal; a sign determinator for determining a sign of the scaled digital I or Q channel symbol signal; and a bit information converter for converting the scaled digital I or Q channel symbol signal into soft bit metric information per bit on the basis of the calculated positive integer and the determined sign value.

In accordance with another aspect of the present invention, there is provided a method for generating a soft bit metric, including the steps of: scaling a digital signal converted through an A/D converter by using a reference value used for determining a space between symbols; calculating a positive integer of the scaled digital I or Q channel symbol signal and determining a sign thereof; and converting the scaled digital I or Q channel symbol signal into soft bit metric information per bit based on the calculated positive integer and the determined sign value.

In accordance with still another aspect of the present invention, there is provided an M-ary QAM receiving system using a soft bit metric generating apparatus, the system including: an I/Q demodulator for recovering a symbol signal of each of an I channel and a Q channel; an I channel soft bit metric generator for converting an I channel symbol signal into soft bit metric information per bit; a Q channel soft bit metric generator for converting a Q channel symbol signal into soft bit metric information per bit; a parallel to serial data converter for performing a parallel to serial conversion on I and Q bit metric information; and an iterative decoder for iteratively decoding the serially converted I and Q bit metric information.

ADVANTAGEOUS EFFECTS

As mentioned above and will be described below, the present invention can substantially reduce the design complexity by employing the Max-Log-MAP algorithm for symbol-to-bit information conversion in the M-ary QAM signal receiving system using Gray mapping that is typically used for forming a symbol with bits.

In particular, according to the present invention, even though the modulation order M may be increased, the calculation courses or routes can be increased as many as the increased number of bits without changing the structure, or the same courses can be used iteratively.

DESCRIPTION OF DRAWINGS

The above and other objects and features of the present invention will become apparent from the following description of the preferred embodiments given in conjunction with the accompanying drawings, in which.

BEST MODE FOR THE INVENTION

The above-mentioned objectives, features, and advantages will be more apparent by the following detailed description associated with the accompanying drawings, and thus, the invention will readily be conceived by those skilled in the art. Further, in the following description, well-known arts will not be described in detail if it seems that they could obscure the invention in unnecessary detail. Hereinafter, preferred embodiments of the present invention will be set forth in detail with reference to the accompanying drawings.

A transmitted M-ary QAM signal is configured in a manner that an m-number ($m=\log_2 M$) of bits are collected to form a codeword which consists of one signal symbol to be sent. At this time, bits constituting a symbol are assigned according to the Gray mapping rule. A Gray coded 2-dimensional signal space having an M-number of signal points is divided into I (Inphase) channel having an N-number of signal points and Q (Quadrature) channel having an L-number of signal points, each channel being Gray coded one-dimensional Pulse Amplitude Modulation (PAM) signal space having the same properties. If the numbers of signal points arranged at the I and Q channels are the same, it becomes a square QAM. Otherwise, it becomes a rectangular QAM.

Figure 1:
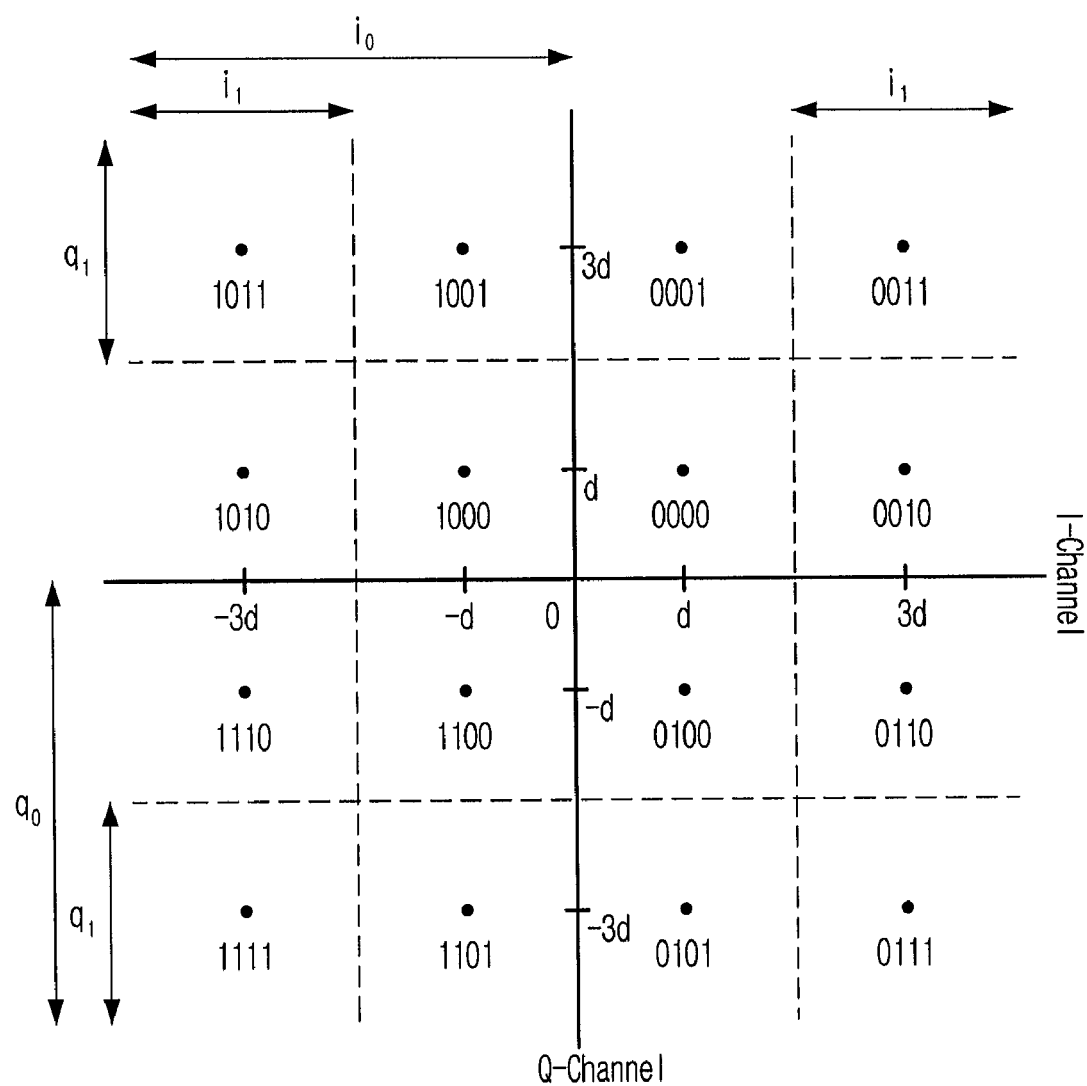
FIG. 1 shows a Gray coded 16-QAM signal constellation which is one of square QAMs where M=16.

FIG. 1 shows a Gray coded 16-QAM signal constellation which is one of square QAMs where M=16.

Using the above constellation, therefore, a soft bit metric of QAM can be generated by recognizing the I and Q channels as respective independent PAMs and through the soft bit metric generation for such PAMs.

Figure 2:
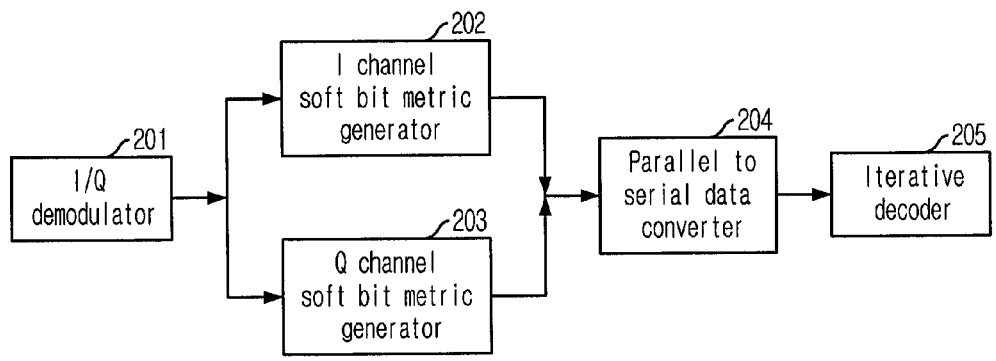
FIG. 2 is a block diagram illustrating an M-ary QAM receiving system using an apparatus for generating a soft bit metric in accordance with one embodiment of the present invention.

FIG. 2 is a block diagram illustrating an M-ary QAM receiving system using a soft bit metric generating apparatus in accordance with one embodiment of the present invention.

As illustrated in FIG. 2, the M-ary QAM receiving system using the apparatus for generating a soft bit metric of the invention includes an I/Q demodulator 201 for demodulating symbol information of each of I and Q channels, I and Q channel soft bit metric generators 202 and 203 for converting symbol signals of the I and Q channels provided through the I/Q demodulator 201 into soft bit metric information per bit, and an iterative decoder 205 for iteratively decoding the I and Q channel bit metric signals outputted from the I and Q channel soft bit metric generators 202 and 203 through a parallel to serial data converter 204.

That is, the M-ary QAM receiving system of the invention is a receiver, in which a received signal is demodulated in the I/Q demodulator 201. More specifically, an output of the I/Q demodulator 201 for recovering symbol information of each of the I and Q channels is inputted to each of the I and Q channel PAM signal soft bit metric generators 202 and 203, to generate I and Q channels soft bit metrics, as will be described with reference to FIG. 5 later. The I and Q bit metric signals are then inputted to the iterative decoder 205 via the parallel to serial data converter 204. As expressed above, each of the I and Q channels soft bit metric generators 202 and 203 is the PAM soft bit metric generator having the same structure.

In a preferred embodiment of the invention, the number of signal points on a PAM signal space is N, and symbol data of a codeword in which each signal point is composed of K bits is mapped to one point on the constellation of a one-dimensional signal space. At this time, when bit values are assigned to each symbol by employing the Gray mapping rule, the left/right signal spaces have an axisymmetry relationship with respect to boundary values of bits constituting codewords.

Figure 3:
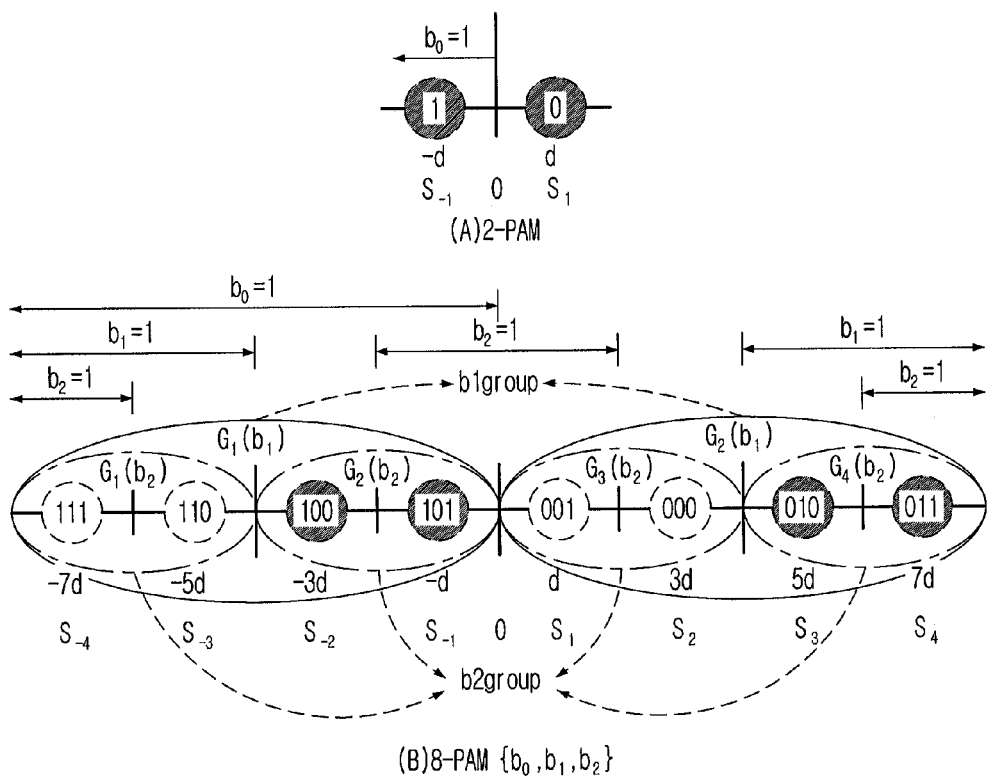
FIG. 3 is a diagram describing a soft bit metric generation principle of an 8-PAM constellation diagram for a Gray coded I or Q signal in accordance with the present invention.

FIG. 3 is diagram for explaining a soft bit metric generation principle of an 8-PAM constellation diagram for a Gray coded I or Q signal in accordance with the present invention, wherein the Gray coded 8-PAM signal constellation and groups by bits are commonly used in the I and Q channels.

In FIG. 3, when seen on the PAM signal space, the arrangement of each bit value among bits constituting a symbol is bilaterally symmetric with respect to the origin 0.

For instance, in $G_1(b_1)$ and $G_2(b_1)$ groups, bit $b_1$ values assigned to each signal point are symmetric with respect to the origin 0; and bit $b_2$ values arranged to each symbol, i.e., $G_1(b_2)$ and $G_2(b_2)$ are symmetric to $G_3(b_2)$ and $G_4(b_2)$ with respect to the 0 point, and $G_1(b_2)$ and $G_2(b_2)$, and $G_3(b_2)$ and $G_4(b_2)$ are symmetric with respect to −4 d and +4 d, respectively. This is the same as shifting the signal space of $b_1$ in the left-hand side signal space by −4 d, and the signal space in the right-hand side signal space by +4 d with respect to the 2-PAM signal space of FIG. 3($a$) or the origin of the $b_0$ signal space. Therefore, it can be seen that the signal space of each group is either identical or axisymmetric to the arrangement of bit values in the 2-PAM signal space, and a coordinate transfer relationship exists between signal spaces.

A received Gray coded N-PAM signal may be expressed as:

$$z = \alpha \cdot s + n \quad \text{Eq. (1)}$$

wherein s denotes a transmitted N-PAM symbol, α denotes a channel gain, and n denotes an Additive White Gaussian Noise (AWGN) in which average is 0 and variance is $\sigma^2$. If α is probably stable (constant), the received signal z becomes a signal that is received through an AWGN channel.

When a PAM signal that is one of I and Q channels is received over the AWGN channel, if an LLR test is conducted, it may be represented by:

$$LLR_I(b_k) = \ln \sum_{A \in \{s: b_k = 1\}} \exp\left(-\frac{(z-A)^2}{2\sigma^2}\right) - \ln \sum_{B \in \{s: b_k = -1\}} \exp\left(-\frac{(z-B)^2}{2\sigma^2}\right) \quad \text{Eq. (2)}$$

wherein $b_k$ denotes a k-th bit value of a received signal symbol, z denotes a received signal, A denotes a +reference signal value, B denotes a −reference signal, and $\sigma^2$ denotes a variance of AWGN noise.

Since Eq. (2) needs logarithmic calculation, it has an increased implementation complexity. Therefore, by applying the following approximated equation, Eq. (3), to Eq. (2) above, Eq. (4) is obtained as follows:

$$\ln \sum_j \exp(-a_j) \approx \max(-a_j) = -\min(a_j) \quad \text{Eq. (3)}$$

$$LLR_I(b_k) \approx \frac{1}{2\sigma^2}\left[\min_{B \in \{s:b_k=-1\}} |z-B|^2 - \min_{A \in \{s:b_k=+1\}} |z-A|^2\right] \quad \text{Eq. (4)}$$

$$= \frac{1}{2\sigma^2}\left[\min_{B \in \{s:b_k=-1\}} (B^2 - 2Bz) - \min_{A \in \{s:b_k=+1\}} (A^2 - 2Az)\right]$$

The above-described Eq. (4) is widely known as the Max-Log-MAP algorithm, but max(·) or min(·) therein becomes a factor in increasing complexity due to an increase in a modulation order N since the number of cases is considered. Therefore, the following equation may be obtained by summarizing the results as discussed above:

$$LLR(b_k) = G_{\hat{z},k} \cdot m_k \cdot \frac{d_{max,k}}{2} \cdot \left(\frac{d_{min,k}}{2} - |\hat{z}_k|\right) \quad \text{Eq. (5)}$$

wherein $\hat{z}_k$ denotes a correction value for a k-th bit group in a received symbol area by a moving distance of the coordinate axis, $G_{\hat{z},k}$ denotes a sign value sign ($\hat{z}_k$) of a corrected symbol value $\hat{z}_k$, $m_k$ indicates whether the k-th bit arrangement in the group coincides with 2-PAM (coincidence: +1, non-coincidence: −1), $d_{min,k}$ denotes a closest distance value to a bit boundary value in a corresponding bit group to which the received signal belongs, and $d_{max,k}$ denotes a farthest distance value from a bit boundary value in a group area of the received symbol.

Also, $d_{min,k}$ and $d_{max,k}$ satisfy the following: $d_{max,k} = d_{min,k} + 2$ d.

For instance, applying an example of the calculation of $d_{max,k}$ and $d_{min,k}$ used in Eq. (5) to a bit $b_1$, in the signal space of FIG. 3($b$), 1) if a received value exists in one of $S_{-1}$, $S_{-4}$, $S_1$ and $S_4$ areas, $$\frac{d_{min,1}}{2} = \begin{cases} |-4d-(-2d)|/2, & \text{for region } S_{-1} \\ |-4d-(-6d)|/2, & \text{for region } S_{-4} \\ |4d-2d|/2, & \text{for region } S_1 \\ |4d-6d|/2, & \text{for region } S_4 \end{cases} = d \quad \text{Eq. (4)}$$

$$\frac{d_{max,1}}{2} = \frac{d_{min,1}}{2} + d = 2d$$

2) if a received value exists in one of $S_{-2}$, $S_{-3}$, $S_2$ and $S_3$ areas, $$\frac{d_{min,1}}{2} = \begin{cases} |-4d-(-4d)|/2, & \text{for region } S_{-2} \\ |-4d-(-4d)|/2, & \text{for region } S_{-3} \\ |4d-4d|/2, & \text{for region } S_2 \\ |4d-4d|/2, & \text{for region } S_3 \end{cases} = 0 \quad \text{Eq. (5)}$$

$$\frac{d_{max,1}}{2} = \frac{d_{min,1}}{2} + d = d$$

In the soft bit metric calculation procedure using Eq. (5), if the received signal belongs to $S_1$ 0≤z≤2 d) among the areas in FIG. 3($b$) for the bit $b_1$, the soft bit metric can be calculated from Eq. (6) blow by using the parameters employed in Eq. (5):

$$s_1: \hat{z}_1 = z - 4d, \; G_1 = -1, \; m_1 = -1, \; \frac{d_{min,1}}{2} = d, \quad \text{Eq. (6)}$$

$$\frac{d_{max,1}}{2} = 2d$$

Therefore, the soft bit metric LLR in this example is determined as follows:

$$LLR_I(b_1) = -1 \cdot -1 \cdot 2d[d - |z - 4d|] = -2d(3d - z) \quad \text{Eq. (7)}$$

The result obtained from Eq. (7) is the same as that obtained by using Eq. (4).

Figure 4:
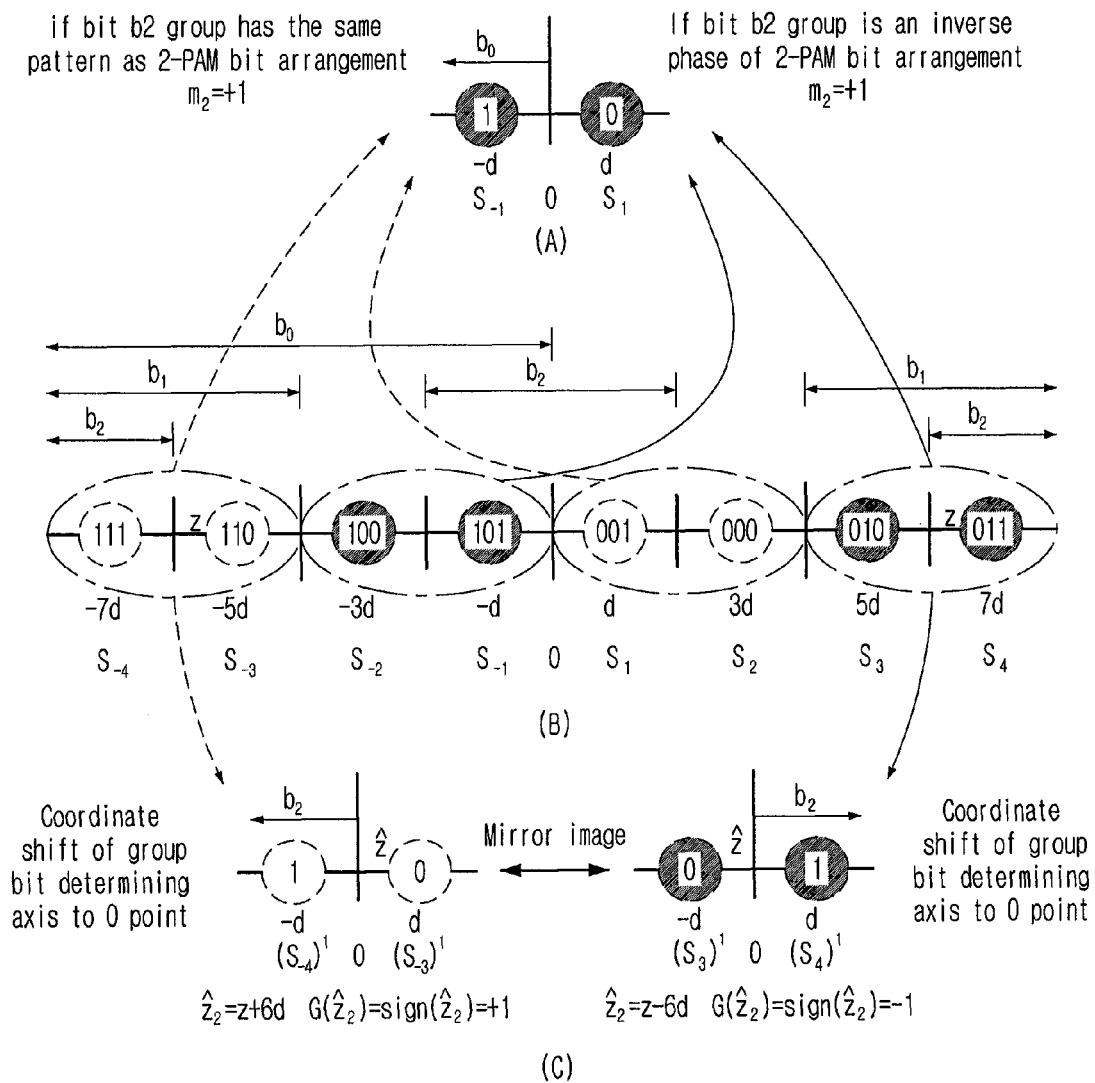
FIG. 4 is a diagram describing a $b_2$ bit soft bit metric generation principle of an 8-PAM constellation for a Gray coded I or Q signal in accordance with the present invention.

FIG. 4 describes a $b_2$ soft bit metric generation procedure among bits constituting an 8-PAM signal symbol in the same method as the principle for generating the $b_1$ soft bit metric as discussed with reference to FIG. 3.

Figure 5:
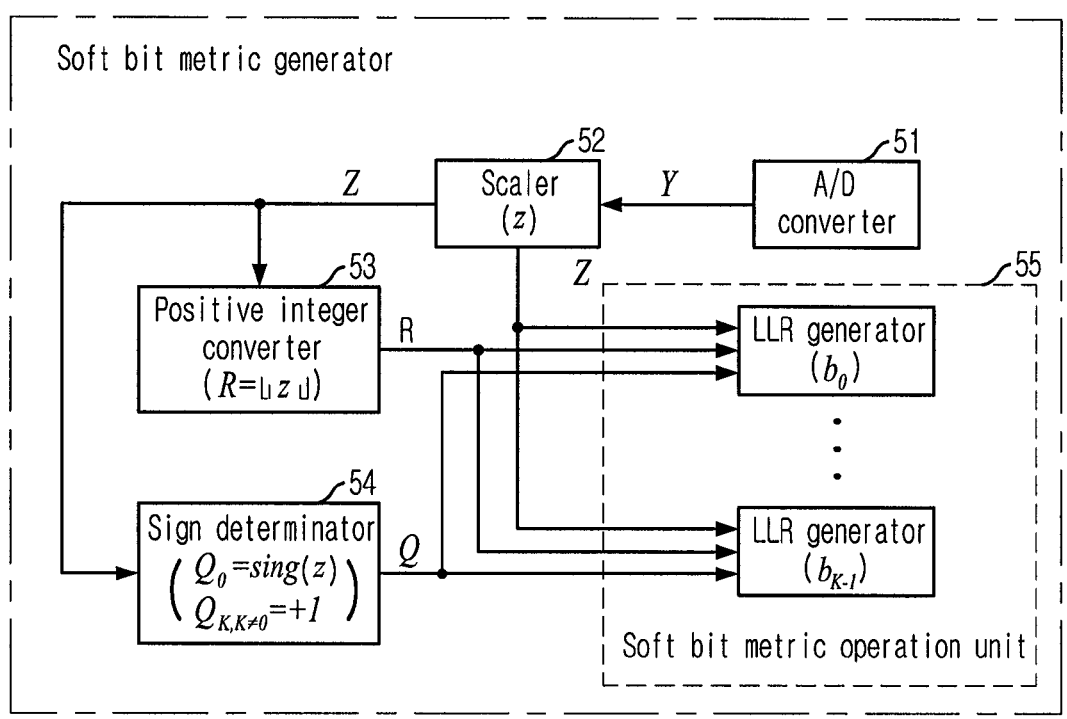
FIG. 5 is a diagram illustrating an apparatus for generating a soft bit metric in accordance with another embodiment of the present invention.
Figure 6:
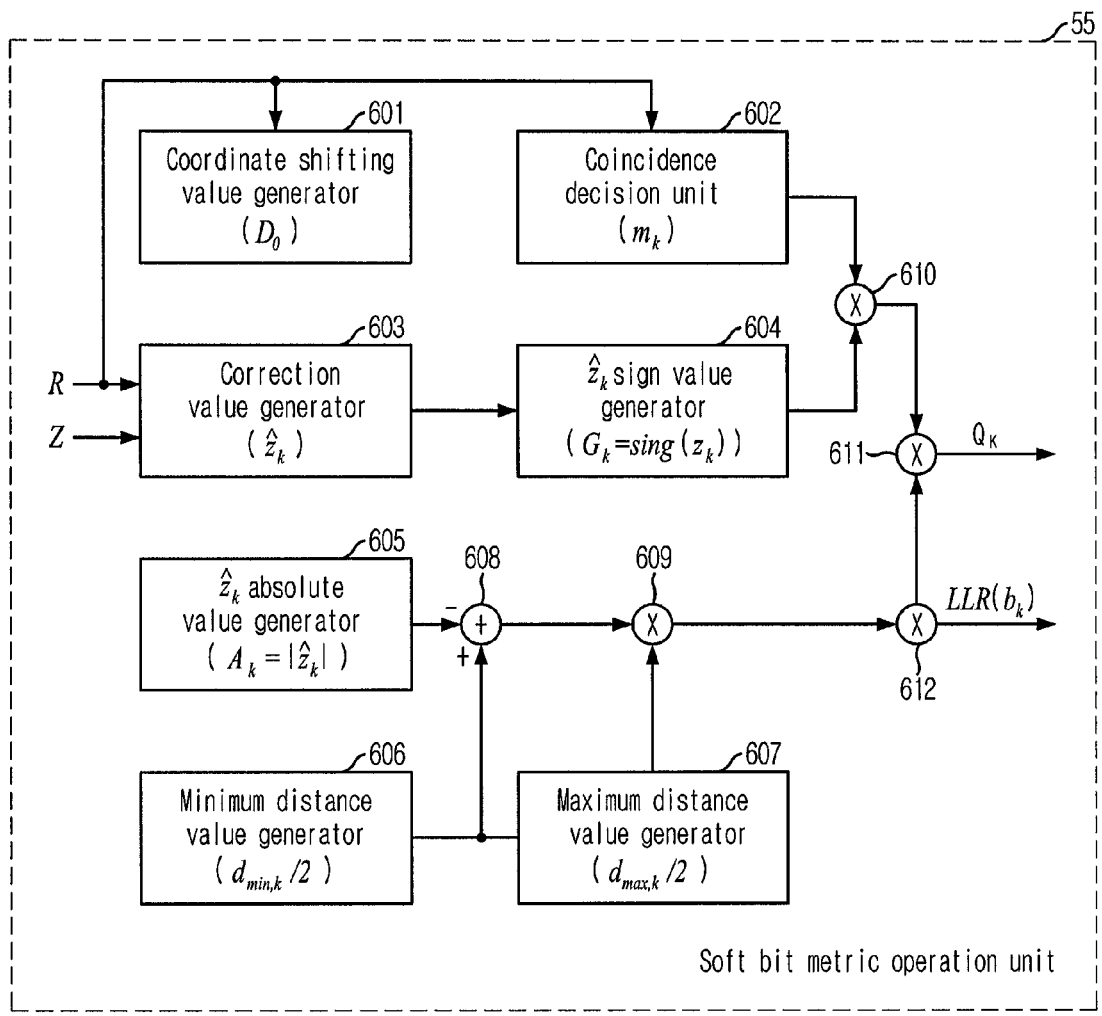
FIG. 6 is a detailed diagram of the soft bit metric operation unit of k-th bit in the soft bit metric generating apparatus in accordance with the invention.
Figure 7:
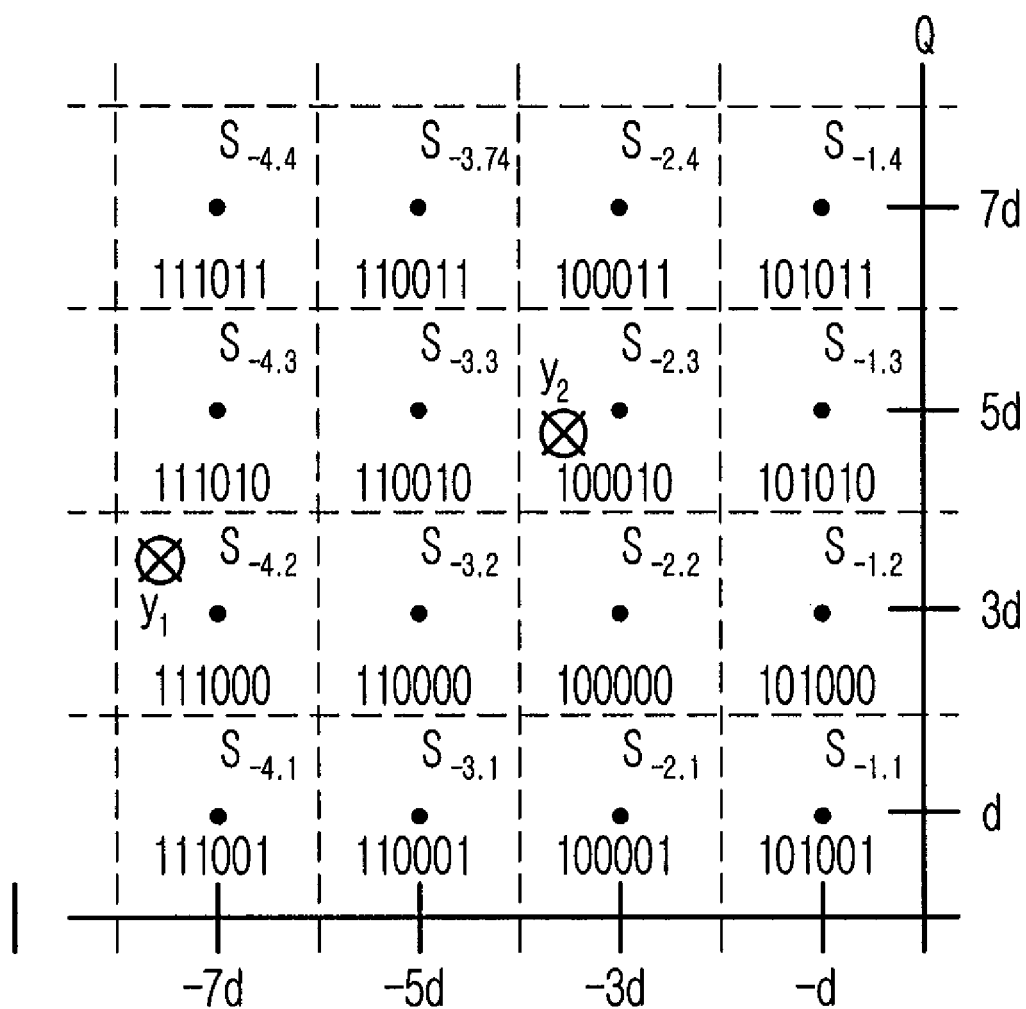
FIG. 7 shows a 64-QAM signal constellation to which the present invention can be applied.

As described above, the present invention relates to the I and Q channel soft bit metric generators 202 and 203 in the M-ary QAM receiving system shown in FIG. 2, each of which includes a soft bit metric operation unit [LLR generators ($b_0$ to $b_{k-1}$) 55 depicted in FIGS. 5 and 6.

The principle of the invention is based on the above-discussed Eq. (5), which is commonly applicable to the I and Q channels. In particular, FIG. 5 shows an algorithm block for implementing the N-PAM soft bit metric generation.

FIG. 5 illustrates a detailed block diagram of the soft bit metric generating apparatus shown in FIG. 2 in accordance with the present invention.

As illustrated in FIG. 5, the soft bit metric generating apparatus that can be commonly used for the I and Q channels includes an A/D converter 51, a scaler 52, a positive integer converter 53, a sign determinator 54, and a soft bit metric operation unit 55.

The A/D converter 51 converts an analog symbol signal of a demodulated I (Inphase) channel or Q (Quadrature) channel into a digital signal. The scaler 52 scales the converted digital signal using a reference value (e.g., d) that is used for determining a signal point position similar to the reference value for determining a space between symbols [(see Eq. (5)]. The positive integer converter 53 calculates a positive integer R of the scaled digital I or Q channel symbol signal Z. The sign determinator 54 determines a sign of the scaled digital I or Q channel symbol signal Z, and the soft bit metric operation unit 55 converts the scaled digital I or Q channel symbol signal Z into soft bit metric information per bit.

Here, an output value of the positive integer converter 53 is expressed as $R=(r_0, r_1, \ldots, r_{K-1})_2$ where $(\ldots)_2$ denotes a binary expression and $r_k$ denotes a value of each digit in the binary expression. Likewise, $r_0$ denotes a Most Significant Bit (MSB) in the binary expression. Now, the soft bit metric operation procedure of the k-th bit implemented in the soft bit metric operation unit 55 of FIG. 5 will be explained in more detail with reference to FIG. 6.

FIG. 6 describes a detailed diagram of the soft bit metric operation unit [LLR generators ($b_0$ to $b_{K-1}$)] 55 for the k-th bit included in the soft bit metric generating apparatus in accordance with the present invention.

As shown in FIG. 6, the soft bit metric operation unit 55 for the k-th bit of the soft bit metric generating apparatus of the invention includes a coordinate shifting value generator 601, a coincidence decision unit 602, a correction value generator 603, a $\hat{z}_k$ sign value generator 604, a $\hat{z}_k$ absolute value generator 605, a minimum distance value generator 606, a maximum distance value generator 607, a real number subtractor 608, real number multipliers 609 and 612, and bit multipliers 610 and 611.

The coordinate shifting value generator 601 calculates a value for the coordinate axis shift (i.e., a coordinate space shifting value) using the positive integer R. That is, it determines, using the positive integer R, a group in the signal space where a received signal is included, and calculates a distance for shifting a bit determining boundary of the group to the origin. The coincidence decision unit 602 compares the K-th bit with the 2-PAM bit by using the positive integer R to decide whether the 2-PAM bit value arrangement is axisymmetric or has the same pattern. The correction value generator 603 generates a new received signal correction symbol value based on the coordinate space shifting value, the scaled digital I or Q channel symbol signal Z, and the positive integer R. The $\hat{z}_k$ sign value generator 604 generates a sign value of the received signal correction symbol value, and the $\hat{z}_k$ absolute value generator 605 generates an absolute value of the received signal correction symbol value (i.e., an absolute value of the coordinate shifting value).

The minimum distance value generator 606, using the absolute value of the coordinate shifting value, generates a minimum distance value in a corresponding group for determining a closest distance value to the bit boundary value therein. The maximum distance value generator 607, using the minimum distance value, generates a maximum distance value in a group area for determining a farthest distance value (the maximum distance value) from the bit boundary value therein. The real number subtractor 608 subtracts the absolute value of the coordinate shifting value from the minimum distance value. The real number multiplier 609 multiplies the result calculated at the real number subtractor 608 by the maximum distance value. The bit multiplier 610 multiplies the results from the coincidence decision unit 602 and the $\hat{z}_k$ sign value generator 604 in the form of bits. The bit multiplier 611 multiplies the operation result of the bit multiplier 610 by the determined sign value Q in the form of bits. The real number multiplier 612 converts the operation result of the real number multiplier 609 into soft bit metric (LLR) information by multiplying the operation result by the operation result of the bit multiplier 611.

To be short, the soft bit metric operation unit 55 of the invention calculates a soft bit metric per bit with z, R, and Q signals obtained from the scaler 52, the positive integer converter 53 and the sign determinator 54 shown in FIG. 5.

The coordinate shifting value ($D_k$) generator 601 determines a group in a signal space where the received signal, as described in FIGS. 3 and 4 and will be discussed in Eq. (8) below, is contained, and then calculates a distance for moving a bit boundary of the group to the origin (0 point).

$$D_0 = 0$$

$$D_1 = 2^{(K-1)}$$

$$D_2 = \{(r_0)_2 \times 2 + 1\} \times 2^{(K-2)}$$

$$D_k = \{(r_0 \wedge r_{k-2})_2 \times 2 + 1\} \times 2^{(K-k)}, k=3, \Lambda, K-1 \quad \text{Eq. (8)}$$

where $(r_0, r_1, \ldots, r_{K-1})_2$ is a binary expression of $R=(r_0, r_1, \ldots, r_{K-1})_2$ outputted from the positive integer converter 603.

In FIG. 6, the coincidence ($m_k$) decision unit 602, which compares the K-th bit with the 2-PAM bit to decide whether the 2-PAM bit value arrangement is axisymmetric or has the same pattern, is expressed as follows:

$$m_0 = 0(+1)$$

$$m_1 = 1(-1)$$

$$m_k = r_{k-2}(0 \text{ or } 1)$$

$$k=2,3\Lambda, K-1 \quad \text{Eq. (9)}$$

where, if $m_k$ value is '+1', it means that two bits coincide with each other, and if $m_k$ value is '−1', it means that two bits do not coincide with each other. The correction value ($\hat{z}_k$) generator 603 generates, on the basis of the principle described in FIG. 3 or 4, a new received signal correction symbol value ($\hat{z}_k$) by using the coordinate space shifting value Dk calculated at the coordinate shifting value generator 601, and z and R that are determined by the scaler 52 and the positive integer converter 53 shown in FIG. 5, respectively.

Moreover, the $\hat{z}_k$ sign value generator 604 generates a sign value $G_k$ of $\hat{z}_k$ based on the received signal correction symbol value $\hat{z}_k$ newly generated by the correction value generator 603, and the $\hat{z}_k$ absolute value generator 605 generates an absolute value ($A_k = |\hat{z}_k|$) of $\hat{z}_k$.

Using the $A_k$ generated by the $\hat{z}_k$ absolute value generator 605, the minimum distance value generator 606 determines a minimum distance value ($d_{min,k}/2$) closest to the bit boundary value in the corresponding group.

Then, using the minimum distance value ($d_{min,k}/2$) determined by the minimum distance value generator 606, the maximum distance value generator 607 generates a maximum distance value ($d_{max,k}/2$) farthest from the bit boundary value in the group area.

Meanwhile, the real number subtractor 608 calculates a difference between the minimum distance value ($d_{min,k}/2$) determined by the minimum distance value generator 606 and the absolute value ($A_k=|\hat{z}_k|$) of the coordinate shifting value $\hat{z}_k$ determined by the $\hat{z}_k$ absolute value generator 605. And, the real number multiplier 607 multiplies the calculation result of the real number subtractor 608 by the maximum distance value ($d_{max,k}/2$) calculated at the maximum distance value generator 607. The bit multiplier 610 multiplies the results from the coincidence decision unit 602 and from the correction value generator 603, and the bit multiplier 611 multiplies the sign value $Q_k$ of the received signal determined by the sign determinator 54 by the result from the bit multiplier 610. The real number multiplier 612 performs sign conversion on the operation result of the real number multiplier 609 depending on the result provided from the bit multiplier 611.

Now, an operation procedure of the soft bit metric generating apparatus of the invention having the above-described structure will be sequentially described in detail with reference to FIGS. 5 and 6.

1) A symbol of a received two-dimensional signal is recovered by the I/Q demodulator 201 shown in FIG. 2.

2) When the recovered symbol signal is inputted to the I and Q channel soft bit metric generators 202 and 203, respectively, the generators 202 and 203 independently generate bit metrics based on the following algorithm.

3) The received PAM symbol signal goes through the A/D converter 51, and is scaled by the scaler 502 with a reference value used for determining a signal point position.

4) A positive integer [$R=(r_0, r_1, \ldots r_{K-1})_2$] of the output of the above 3) is calculated through the positive integer converter 503.

5) Using the output of the above 4), the coordinate shifting value generator 601 calculates a value for shifting the coordinate axis.

6) Based on the output of the above 4), the coincidence decision unit 602 decides whether the 2-PAM bit value arrangement is axisymmetric or has the same pattern.

7) With respect to $b_0$, the sign value from the $\hat{z}_k$ sign value generator 604 is taken by using the received symbol value that is the output of the above 3).

8) Using the coordinate axis shifting value calculated at the above 5), the correction value generator 603 corrects the received symbol value by shifting the coordinate axis.

9) The $\hat{z}_k$ sign value generator 604 determines a sign value of the corrected symbol value like the following: $G_k=\text{sign}(\hat{z}_k)$, and the bit multipliers 610 and 611 determine sign values of $G_k$ and $m_k$.

10) Using the output of the above 8), the minimum distance value generator 606 generates a minimum distance value $d_{min,k}/2$ closest to a bit boundary value in a corresponding group and the maximum distance value generator 607 generates a maximum distance value $d_{max,k}/2$ farthest from to a bit boundary value in a group area.

11) Using the results thus obtained, the real number multiplier 612 calculates a soft bit metric LLR per bit.

When received signals exist in a 64-QAM signal space, the operation result using the algorithm suggested by the invention is shown in Table 1 below:

TABLE 1

Soft bit metric operation procedure of 64-QAM signal and its results

| | $y_1 = (-7.8d, 3.5d)$ | | | | | | $y_2 = (-3.5d, 4.5d)$ | | | | | |
|---|---|---|---|---|---|---|---|---|---|---|---|---|
| | i = −7.8d | | | q = 3.5d | | | i = −3.5d | | | q = 4.5d | | |
| Steps | $b_{I,0}$ | $b_{I,1}$ | $b_{I,2}$ | $b_{Q,1}$ | $b_{Q,2}$ | $b_{Q,3}$ | $b_{I,0}$ | $b_{I,1}$ | $b_{I,2}$ | $b_{Q,1}$ | $b_{Q,2}$ | $b_{Q,3}$ |
| 1) \|z\| | | 7.8 | | | 3.5 | | | 3.5 | | | 4.5 | |
| 2) R | | $(111)_2$ | | | $(012)_2$ | | | $(011)_2$ | | | $(100)_2$ | |
| 3) $C_k$ | 0 | 4 | 6 | 0 | 4 | 2 | 0 | 4 | 2 | 0 | 4 | 6 |
| 4) $m_k$ | +1 | −1 | −1 | +1 | −1 | +1 | +1 | −1 | +1 | +1 | −1 | −1 |
| 5) $Q_k$ | −1 | +1 | +1 | +1 | +1 | +1 | −1 | +1 | +1 | +1 | +1 | +1 |
| 6) $\hat{Z}_k$ | 7.8 | 3.8 | 1.8 | 3.5 | −0.5 | 1.5 | 3.5 | −0.5 | 1.5 | 4.5 | 0.5 | −1.5 |
| 7) $G_k$ | −1 | +1 | +1 | +1 | −1 | +1 | −1 | −1 | +1 | +1 | +1 | −1 |
| 8) $d_{min,k}$ | 3 | 1 | 0 | 1 | 0 | 0 | 1 | 0 | 0 | 2 | 0 | 0 |
| 9) $d_{max,k}$ | 4 | 2 | 1 | 2 | 1 | 1 | 2 | 1 | 1 | 3 | 1 | 1 |
| 10) LLR | 19.2 | 5.6 | 1.8 | −5.0 | −0.5 | −1.5 | 5.0 | −0.5 | −1.5 | −7.5 | 0.5 | −1.5 |
| Decision | 1 | 1 | 1 | 0 | 0 | 0 | 1 | 0 | 0 | 0 | 1 | 0 |

The method of the present invention as mentioned above may be implemented by a software program that is stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-0119590, and No. 2006-0083170, filed in the Korean Intellectual Property Office on Dec. 8, 2005 and Aug. 30, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for generating a soft bit metric, comprising:
  an analog to digital converting means for converting an analog symbol signal of a demodulated I (Inphase) or Q (Quadrature) channel into a digital signal;
  a scaling means for scaling the converted digital signal based on a reference value used for determining a space between symbols;
  a positive integer converting means for calculating a positive integer of the scaled digital I or Q channel symbol signal;
  a sign determining means for determining a sign of the scaled digital I or Q channel symbol signal; and a bit information converting means for converting the scaled digital I or Q channel symbol signal into soft bit metric information per bit on the basis of the calculated positive integer and the determined sign value.

2. The apparatus as recited in claim 1, wherein the apparatus is a Pulse Amplitude Modulation (PAM) soft bit metric generator that is commonly used in the I and Q channels.

3. The apparatus as recited in claim 2, wherein the bit information converting means includes:
- a coordinate shifting value generating means for calculating a value for shifting a coordinate axis (or coordinate space shifting value) by using the positive integer;
- a coincidence decision means for deciding whether a 2-PAM bit value arrangement is axisymmetric or has the same pattern by using the positive integer;
- a received signal correction value generating means for generating a new received signal correction symbol value based on the coordinate space shifting value, the scaled digital I or Q channel symbol signal and the calculated positive integer;
- a sign value generating means for generating a sign value of the received signal correction symbol value;
- an absolute value generating means for generating an absolute value of the received signal correction symbol value (or absolute value of the coordinate shifting value);
- a first distance value determining means for determining a closest distance value (or minimum distance value) to a bit boundary value in a corresponding group by using the absolute value of the coordinate shifting value;
- a second distance value determining means for determining a farthest distance value (or maximum distance value) from a bit boundary value in a group area by using the minimum distance value;
- a first operation means for subtracting the absolute value of the coordinate shifting value from the minimum distance value;
- a second operation means for multiplying an operation result of the first operation means by the maximum distance value;
- a third operation means for multiplying determination results from the coincidence decision means and the received signal sign value generating means;
- a fourth operation means for bit multiplying an operation result of the third operation means by the determined sign value; and
- a fifth operation means for converting the operation result of the second operation means into soft bit metric Log Likelihood Ratio (LLR) information based on an operation result of the fourth operation means.

4. The apparatus as recited in claim 3, wherein the soft bit metric LLR information is calculated as:

$$LLR(b_k) = G_{\hat{z}_k} \cdot m_k \cdot \frac{d_{max,k}}{2} \cdot \left( \frac{d_{min,k}}{2} - |\hat{z}_k| \right) \quad \text{Eq. (1)}$$

wherein $\hat{z}_k$ denotes a correction value for a k-th bit group in a received symbol area by a moving distance of the coordinate axis, $G_{\hat{z}_k}$ denotes a sign value sign ($\hat{z}_k$) of a corrected symbol value $\hat{z}_k$, $m_k$ indicates whether the k-th bit arrangement in the group coincides with 2-PAM (coincidence: +1, non-coincidence: −1), $d_{min,k}$ denotes a closest distance value to a bit boundary value from a corresponding bit group to which the received signal belongs, $d_{max,k}$ denotes a farthest distance value from a bit boundary value in a group area of the received symbol, $d_{max,k}$ being defined as follows: $d_{max,k}=d_{min,k}+2$ d.

5. The apparatus as recited in claim 4, wherein, among the parameters used in said Eq. (1), the parameter for shifting the coordinate axis is defined as follows:

$$D_0=0$$

$$D_1=2^{(K-1)}$$

$$D_2=\{(r_0)_2 \times 2+1\} \times 2^{(K-2)}$$

$$D_k=\{(r_0 \wedge r_{k-2})_2 \times 2+1\} \times 2^{(K-k)}, k=3, \Lambda, K-1 \quad \text{Eq. (2)}$$

where $(r_0, r_1, \ldots, r_{K-1})_2$ is a binary expression of $R=(r_0, r_1, \ldots, r_{K-1})_2$ outputted from the positive integer converter.

6. The apparatus as recited in claim 4, wherein, among the parameters used in said Eq. (1), the coincidence decision of the bit value arrangement on the signal space is expressed as:

$$D_0=0$$

$$D_1=2^{(K-1)}$$

$$D_2=\{(r_0)_2 \times 2+1\} \times 2^{(K-2)}$$

$$D_k=\{(r_0 \wedge r_{k-2})_2 \times 2+1\} \times 2^{(K-k)}, k=3, \Lambda, K-1 \quad \text{Eq. (3)}$$

where, if $m_k$ value is '+1', it means that two bits coincide with each other, and if $m_k$ value is '−1', it means that two bits do not coincide with each other.

7. A method for generating a soft bit metric, comprising the steps of:
- (a) scaling a digital signal converted through an A/D converter by using a reference value used for determining a space between symbols;
- (b) calculating a positive integer of the scaled digital I or Q channel symbol signal and determining a sign thereof; and
- (c) converting the scaled digital I or Q channel symbol signal into soft bit metric information per bit based on the calculated positive integer and the determined sign value.

8. The method as recited in claim 7, wherein the step (c) includes the steps of:
- (c1) calculating a value for shifting a coordinate axis (or coordinate space shifting value), and deciding whether a 2-PAM bit value arrangement is axisymmetric or has the same pattern, by using the positive integer;
- (c) generating a new received signal correction symbol value based on the coordinate space shifting value, the scaled digital I or Q channel symbol signal and the calculated positive integer;
- (c3) generating a sign value and an absolute value of the received signal correction symbol value (or absolute value of the coordinate shifting value);
- (c4) determining a closest distance value (or minimum distance value) to a bit boundary value in a corresponding group by using the absolute value of the coordinate shifting value;
- (c5) determining a farthest distance value (or maximum distance value) from a bit boundary value in a group area by using the minimum distance value;
- (c6) subtracting the absolute value of the coordinate shifting value from the minimum distance value, and multiplying the subtraction result by the maximum distance value;
- (c7) multiplying the results obtained at the step (c1) and at the step (c3), and multiplying the multiplication result by the determined sign value; and (c8) converting the operation result obtained at the step (c6) into soft bit metric LLR information based on the operation result obtained at the step (c7).

9. An M-ary Quadrature Amplitude Modulation (QAM) receiving system using a soft bit metric generating apparatus, the system comprising:
- an I/Q demodulating means for recovering a symbol signal of each of an I (Inphase) channel and a Q (Quadrature) channel;
- an I channel soft bit metric generating means for converting an I channel symbol signal into soft bit metric information per bit;
- a Q channel soft bit metric generating means for converting a Q channel symbol signal into soft bit metric information per bit;
- a parallel to serial data converting means for performing a parallel to serial conversion on I and Q bit metric information; and
- an iterative decoding means for iteratively decoding the serially converted I and Q bit metric information.

10. The system as recited in claim 9, wherein the I channel soft bit metric generating means and the Q channel soft bit metric generating means are PAM soft bit metric generators that are commonly used for the I and Q channels.

11. The system as recited in claim 10, wherein the PAM soft bit metric generator includes:
- an analog to digital converting means for converting an analog symbol signal of a demodulated I or Q channel into a digital signal;
- a scaling means for scaling the converted digital signal by using a reference value used for determining a space between symbols;
- a positive integer converting means for calculating a positive integer of the scaled digital I or Q channel symbol signal;
- a sign determining means for determining a sign of the scaled digital I or Q channel symbol signal; and
- a bit information converting means for converting the scaled digital I or Q channel symbol signal into soft bit metric information per bit based on the calculated positive integer and the determined sign value.

* * * * *